March 31, 1931.    H. CHIBNIK    1,799,003
AUXILIARY PLOWSHARE
Filed May 3, 1929
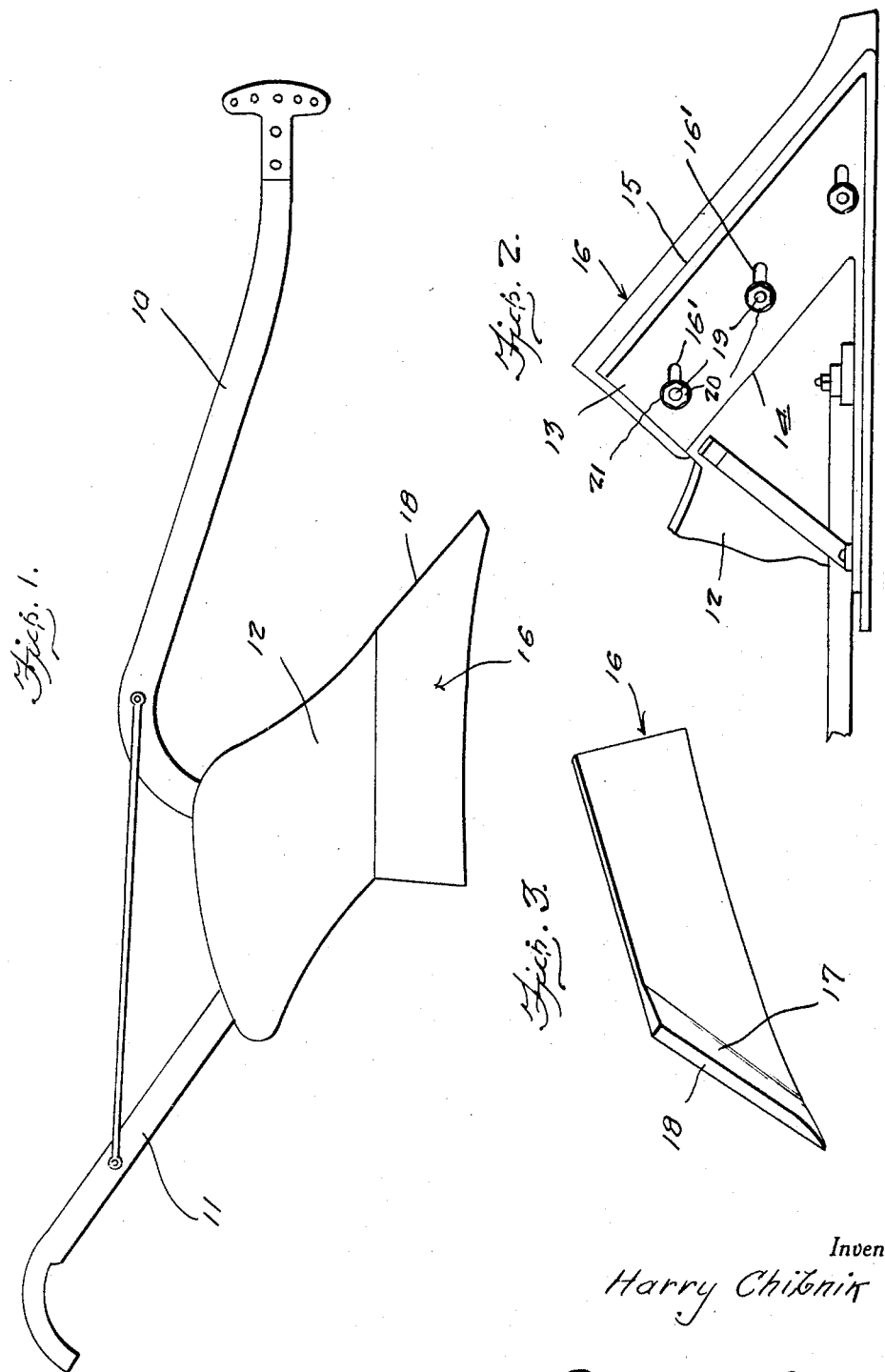
Inventor
Harry Chibnik
By Clarence A. O'Brien
Attorney Patented Mar. 31, 1931

1,799,003

UNITED STATES PATENT OFFICE

HARRY CHIBNIK, OF SIOUX FALLS, SOUTH DAKOTA, ASSIGNOR OF ONE-HALF TO W. S. REESE, OF SIOUX FALLS, SOUTH DAKOTA

AUXILIARY PLOWSHARE

Application filed May 3, 1929. Serial No. 360,029.

This invention relates to agricultural implements and more particularly to that type of implements used in cutting into and loosening the soil.

An object of the invention is to provide, in a manner as hereinafter set forth, an auxiliary soil engaging blade that is reinforced to provide a thickened cutting edge and moreover to provide a blade which is not only demountable but is adjustable with respect to the original ground engaging element.

Another object of the invention is to provide an auxiliary blade that may be applied directly upon the conventional type of blade in use by merely cutting the slot in the original blade by using a blow torch or the like.

Another object of the invention is to provide for replacing the blades in case of undue wearing by removing the nuts that hold the blades to the share.

Further objects of the invention are to provide, in a manner as hereinafter set forth, a device of the character referred to, which is strong, compact and durable, highly efficient for its intended purpose, very simple in its means of assembly, requiring very little modification of a standard plow or cultivator and comparatively inexpensive to manufacture and install on the conventional type of plow or cultivator.

With the foregoing and other objects in view, the invention consists of a novel construction, combination and arrangement of parts, as will be hereinafter more specifically described and illustrated in the accompanying drawings, wherein is disclosed an embodiment of the invention, but it is to be understood that changes, variations and modifications may be restorted to without departing from the spirit of the claim hereunto appended.

In the drawings wherein like reference characters denote corresponding parts throughout the several views:

Figure 1 is a side elevation of the plow, on the cutting side, illustrating an adaptation therewith, of the device in accordance with this invention, Figure 2 is a fragmentary bottom plan view in proximity to the point of the plow, Figure 3 is a perspective view of the blade in accordance with this invention.

Referring to the drawing in detail, wherein is disclosed an embodiment of the invention, and particularly to Figures 1, 2 and 3 thereof wherein is disclosed the device applied to a plow; 10 indicates a conventional plow beam having rearwardly directed handles 11 secured thereto and a mold board of the plow secured to the beam 10.

The conventional plow share 13 is secured to the base of the mold board 12 and is provided intermediate its upper and lower edges 14, 15 respectively with a plurality of diagonally extending slots 16' horizontally spaced from each other. The slots 16' may be burnt in the original plow share 13 by means of an acetylene torch, when it is desired to modify the plow after it has been purchased or the slots may be formed at the factory anticipating the application of this invention.

The auxiliary plow share is in the form of a plate indicated generally at 16 having the body thereof flared outwardly as at 17 adjacent the forward angular edge 18 thereof to provide a thickened ground engaging edge for the purpose of reinforcing the plate to prevent undue wear or cutting away of the forward edge thereby eliminating frequent trips to the blacksmith's shop to have the edge drawn and sharpened.

Intermediate the upper and lower edges of the plate 16, on the inner face thereof are secured a plurality of laterally projecting longitudinally spaced, peripherally threaded lugs 19 which extend through the plurality of slots 16' and mounted on the outer ends thereof are nuts 20 by means of which the auxiliary plate 16 is secured to the outer face of the original plow share 13.

To provide for a better fit between the parts, washers 21 may be disposed on the lugs 19 between the nuts 20 and the inner face of the original plow share 13. The slots provide for the adjustment of the auxiliary plate 16 when the same becomes worn, while at the same time the removal of the nuts from the lugs provide for replacing in case the parts become broken or otherwise unfit for use.

Having disclosed my invention, what I claim as new is:

In combination with a plow, a plow share having diagonally extending horizontally spaced slots formed intermediate its top and bottom edges, an adjustable and removable plate having horizontally spaced peripherally threaded lugs projecting laterally from the inner face thereof and adapted to be disposed in abutting relation to the outer face of said plow share, said lugs projecting through the slots in said share, nuts threadably engaging said lugs and inner face of said share for securing said plate to the share in demountable and adjustable relation to each other, said plate having its marginal portion adjacent the angular edge flaring outwardly to provide a thickened wearing surface.

In testimony whereof I affix my signature.

HARRY CHIBNIK.